United States Patent
Bryson et al.

(10) Patent No.: US 10,033,820 B2
(45) Date of Patent: Jul. 24, 2018

(54) METHOD AND SYSTEM FOR OPPORTUNISTIC DELIVERY OF LESS-THAN-BEST-EFFORT APPLICATION DATA OVER COMMUNICATION NETWORKS

(75) Inventors: Sidney Llewellyn Bryson, Bolingbrook, IL (US); David Albert Rossetti, Randolph, NJ (US); Harvey Rubin, Morristown, NJ (US); Douglas William Varney, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1957 days.

(21) Appl. No.: 12/217,820

(22) Filed: Jul. 9, 2008

(65) Prior Publication Data

US 2010/0011056 A1   Jan. 14, 2010

(51) Int. Cl.
*H04L 29/08* (2006.01)

(52) U.S. Cl.
CPC .................. *H04L 67/24* (2013.01)

(58) Field of Classification Search
USPC ....................................... 709/203
See application file for complete search history.

(56) References Cited

U.S. PATENT DOCUMENTS

| | | | |
|---|---|---|---|
| 2002/0191575 A1* | 12/2002 | Kalavade et al. | 370/338 |
| 2003/0061323 A1* | 3/2003 | East et al. | 709/223 |
| 2003/0194987 A1* | 10/2003 | Pattabiraman et al. | 455/403 |
| 2004/0184461 A1* | 9/2004 | Forssell et al. | 370/395.2 |
| 2004/0248574 A1* | 12/2004 | Watanabe et al. | 455/435.1 |
| 2005/0003765 A1* | 1/2005 | Alfano et al. | 455/67.11 |
| 2005/0085229 A1* | 4/2005 | Yamaguchi | 455/432.2 |
| 2005/0213555 A1* | 9/2005 | Eyuboglu et al. | 370/349 |
| 2006/0007862 A1* | 1/2006 | Sayeedi et al. | 370/235 |
| 2007/0133484 A1* | 6/2007 | Albal et al. | 370/338 |
| 2007/0187491 A1* | 8/2007 | Godwin et al. | 235/380 |
| 2007/0207825 A1* | 9/2007 | Harris et al. | 455/515 |
| 2008/0176583 A1* | 7/2008 | Brachet et al. | 455/456.3 |
| 2008/0182558 A1* | 7/2008 | Rhee | 455/412.1 |
| 2010/0057884 A1* | 3/2010 | Brownell et al. | 709/219 |

* cited by examiner

*Primary Examiner* — Angela Nguyen (74) *Attorney, Agent, or Firm* — McCormick, Paulding & Huber, LLP (57) ABSTRACT

In a method and system for opportunistic delivery of less-than-best-effort application data, a WIN network identified the elements of the wireless network servicing a specified mobile client. One or more elements of the wireless network servicing the specified mobile client monitor the connection state of a mobile client and notify the WIN network of connection state changes so that a chatty application running on an external application server may be notified by the WIN network to deliver packet data when the specified mobile client is connected to the network for some other purpose or when unused network resources are available. In this way, network resource overload caused by chatty applications is reduced.

19 Claims, 5 Drawing Sheets

METHOD AND SYSTEM FOR OPPORTUNISTIC DELIVERY OF LESS-THAN-BEST-EFFORT APPLICATION DATA OVER COMMUNICATION NETWORKS

FIELD OF THE INVENTION

The present invention relates to communications and, more particularly, to methods and systems for controlling data flow in wireless communication networks.

BACKGROUND OF THE INVENTION

Wireless radio frequency communication systems enable people to communicate with one another over long distances without having to access landline-connected devices such as conventional telephones. While early systems were primarily configured for voice communications, technological improvements have enabled the development of "3-G" (third generation) and similar wireless networks for both voice and high-speed packet data transfer. For example, CDMA-based, "1x-EVDO" (Evolution Data Optimized, or Evolution Data Only) wireless communication networks, now implemented in many parts of the U.S. and elsewhere, use the CDMA2000® 3-G mobile telecommunications protocol/specification for the high-speed wireless transmission of both voice and non-voice data. 1x-EVDO is an implementation of CDMA2000® that supports high data rates, specifically, forward link data rates up to 3.1 Mbit/s, and reverse link rates up to 1.8 Mbit/s in a radio channel dedicated to carrying high-speed packet data, e.g., a 1.25 MHz-bandwidth (or greater) radio channel separate from the radio channel for carrying voice data.

In 3-G packet data networks, e.g., those using the Internet Protocol ("IP") for data transmission generally and voice over IP ("VoIP") for voice-data transmission, data is broken into a plurality of addressed data packets. The data packets, both voice and non-voice, are then transmitted and routed over an IP-based communications network, where they are received and reassembled by the access terminal to which the data packets are addressed.

A wireless communication network such as a cellular phone network typically includes one or more fixed base stations each with a base station controller and various transceivers and antennae for carrying out wireless, radio-frequency communications with a number of distributed wireless units. The wireless units may include mobile phones, wireless PDA's, wireless devices with high-speed data transfer capabilities, such as those compliant with "3-G" or "4-G" standards, for example, "WiFi"-equipped computer terminals, and the like. The base stations are in turn interfaced with a core data network and/or public switched telephone network through one or more network controllers or control centers, which act as the interface between the wireless/radio end of the network and the landline portion of the network, including performing the signaling functions necessary to establish calls and other data transfer to and from the wireless units. The network controller may be part of the base station equipment, or it may be a separate mobile switching center ("MSC"), radio network controller ("RNC"), or the like that services a number of base stations.

In a wireless communication network, an application running on an external application server, connected to the Internet may communicate with a mobile client through the core network by transmitting packets over the network. In a typical wireless communication network, flow of a packet from the application server to the mobile client will first be routed over the Internet to the wide area network's ("WAN") home agent. The packet is then routed to the Packet Data Servicing Node ("PDSN") and on to the Packet Control Function ("PCF"). From the PCF, the packet is sent to the Radio Network Controller ("RNC"), which transmits the packet to the mobile client through a Base Transmission Station ("BTS").

Wireless communications between the base transmission stations and wireless units are carried out using standard methods depending on the type and configuration of the wireless network. For example, the network may be a GSM network, a 1x-EVDO network, or the like. GSM is the Global System for Mobile Communications standard, used predominantly in Europe and Asia. 1x-EVDO is an implementation of the CDMA2000® "3-G"/third generation mobile telecommunications protocol/specification configured for the high-speed wireless transmission of both voice and non-voice data, used in North America.

The air interface in a wireless network (e.g., the radio link between one or more fixed base transmission stations and various mobile or other wireless access terminals) is dynamic by nature, and thus, there may be occasions where not enough bandwidth is available to accommodate every active user according to target quality of service ("QOS") levels. Additionally, even if bandwidth is available, there may be times when it is not possible to meet target or required QOS levels in transmitting data packets to a wireless access terminal, due to varying radio airlink conditions or the like.

In some instances, these problems may be compounded as a result of limitations in network electronic processing capacity. In particular, carrying out wireless packet data communications involves the ongoing electronic processing of large numbers of data packets. For this purpose, each element of network infrastructure (e.g., wireless units, base stations, RNC, etc.) will typically include one or more microprocessors or other electronic processing units. When network traffic load is heavy, processor resources may be overextended, e.g., in a particular leg/hop of the communication channel there may not be enough processing power to accommodate the data load according to required or target QOS levels.

Within a wireless network's service area, a mobile client can be in either an idle state where battery resources are preserved or a connected state where significantly more air interface resources are consumed. In the idle state, user data cannot flow, whereas data may flow in either direction in the connected state. Radio access network ("RAN") resources are consumed not only in maintaining the connected state, but also in transitioning from the idle state to the connected state, in particular, for mobile terminated data where the mobile must first be located. Additional RAN resources are consumed prior to releasing traffic connection resources because an inactivity timer is employed to prevent premature release of resources.

Some applications with which a mobile client will transact may be classified as chatty or bursty applications. Chatty or bursty applications are characterized in that they have low average bit rates and large interpacket spacing, which makes chatty applications inefficient with regard to total data delivered per network resource used. The inefficiency of chatty applications, therefore, makes it highly inefficient to employ network resources to initiate or maintain a connected state solely for the chatty application. Furthermore, because of the inefficiency of chatty applications, wide scale deployment of chatty applications over a wireless network can compound the above-mentioned network resource problems by easily congesting an entire wireless network, resulting in flow drop and dropped packets, which leads to poor quality calls and unacceptable system performance.

SUMMARY OF THE INVENTION

An embodiment of the present invention relates to a method and system for packet delivery from an application server to a mobile client in a wireless network, e.g. for reducing network resource overload caused by chatty applications. The wireless network includes one or more base stations and one or more upstream network entities, e.g., a radio network controller ("RNC"), connected to the base station(s). The upstream network entities include necessary components (e.g., a packet data serving node ("PDSN")) to enable communication between an application server connected to the Internet and the end user mobile clients. The base station wirelessly communicates with a set of distributed end user mobile clients, e.g., mobile phones. The RNC (or other upstream network entity) acts as an interface between the base station and the upstream portion of the network. Thus, during communication, as the RNC receives data flows from an application server designated for transmission to the end user mobile clients, the data flows are transmitted to the base station. (A "flow" is a uniquely defined stream of data packets between a source address/port and a destination address/port, wherein the packets are generated according to the same protocol.) The data flows over the RAN typically include tunneled or encrypted data packets, and therefore, it is very difficult for the RAN itself to inspect the data packets flowing through. The network additionally includes a wireless information node ("WIN") network having at least one wireless information node and at least one wireless information database. The WIN network is connected to the RAN network such that the WIN network is capable of detecting an element of the RAN network servicing the mobile client, e.g. the RNC or base station with which the mobile client is wirelessly communicating. Additionally, the WIN network is adapted for connection to the application server, e.g. information may be transmitted between the WIN network and the application server. Since the WIN network is connected to both the RAN network and the application server, the WIN network provides linkage between the IP data flows and the RAN elements or nodes that are delivering the flows to the mobile client, thereby eliminating the need for the RAN to inspect the data packets flowing through the RAN network.

In operation, an application server registers with the WIN network to be notified when the mobile client with which communication is desired transitions to or from a connected state, e.g. from an idle state to a connected state. The WIN network detects the element(s) in the RAN network serving the mobile client and subscribes with the element(s) to be notified when the connection state changes. The element(s) serving the mobile client detects the connection state of the mobile client and notifies the WIN network of a change in the connection state of the mobile client, e.g. from idle to connected. The WIN network in turn notifies the application server of the change in the connection state of the mobile client, whereby the application server delivers packets to the mobile client upon notification of a connected state at the application server. Since the WIN network is connected to both the RAN network and the application server, the WIN network eliminates the need for the RAN to inspect the data packets flowing through the RAN network because the WIN network provides a linkage between the IP data flows and the RAN elements or nodes that are delivering the flows to the mobile client.

In another embodiment, the RAN network automatically delays paging to initiate delivery of network initiated non-latency sensitive data, e.g. the data from an application server having Quality of Service ("QoS") requirements that allow the data to be delivered in the background. An application server registered with the WIN network may bypass the automatic delay by sending a page request to the WIN network, the WIN network triggering paging upon receipt of the page request.

In another embodiment, detection that the mobile client has activated it's traffic channel, e.g. transitioned to a connected state, may be performed through analysis of accounting records.

In another embodiment, the WIN network detects the resource level of the element of the RAN servicing the mobile, while the mobile client is in an idle state. If it is detected that the element has available resources that can be provided for the application server registered with the WIN network, the WIN network notifies the application server, and upon notification, the application server may deliver queued presence information to the mobile client.

In another embodiment, the WIN network is notified when the mobile client becomes idle or disconnects from the network, e.g. the mobile client's traffic connection is closed. The WIN network notifies the application server that the mobile client's traffic connection has been closed, whereby the application server identifies when to renew queuing incoming packets.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
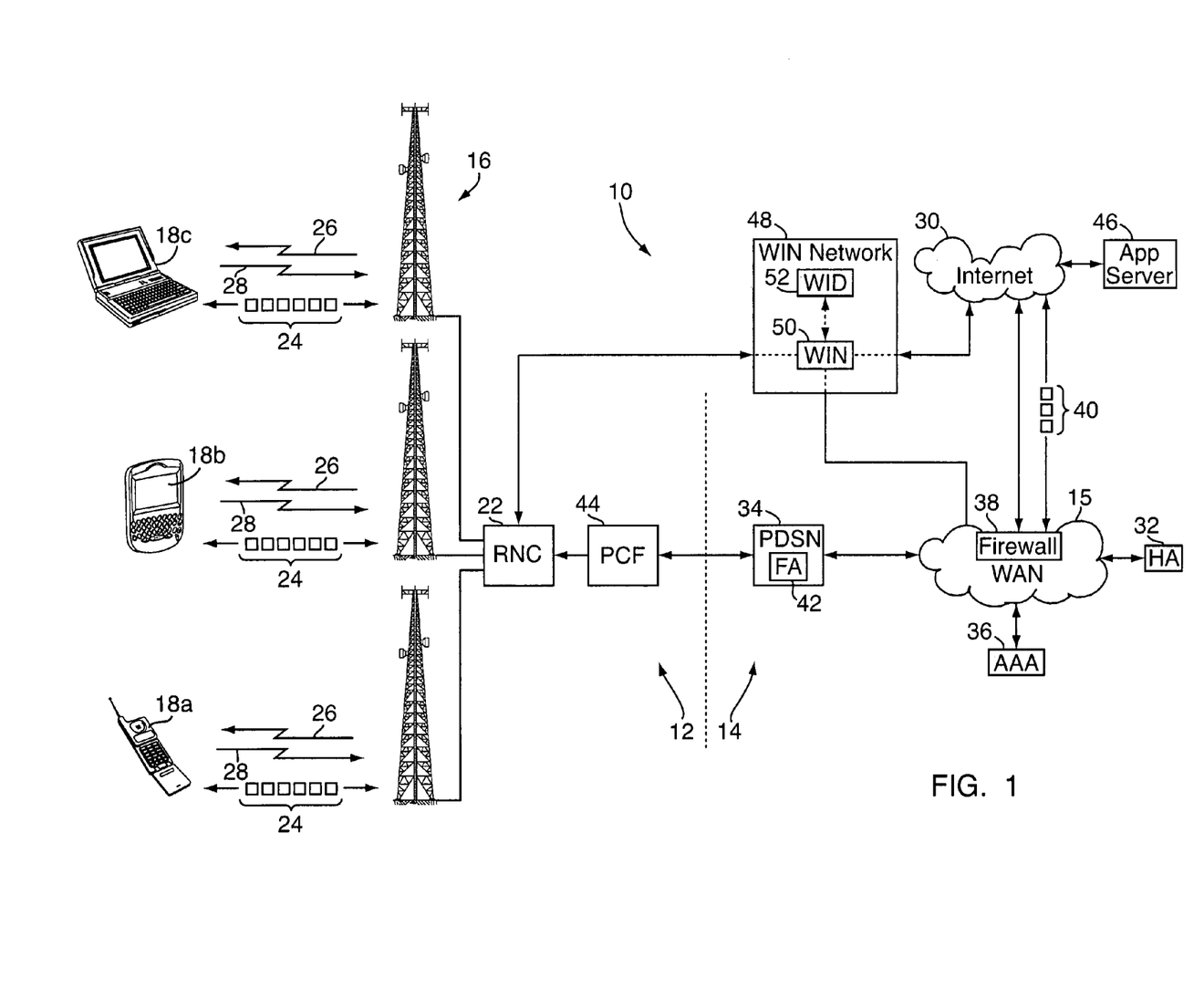
FIG. 1 is a schematic diagram of a cellular network according to an embodiment of the present invention.

With reference to FIG. 1, an embodiment of a method and apparatus for opportunistic delivery of less-than-best-effort application data are implemented on or as part of a wireless communication network 10, e.g., a CDMA-based 1×-EVDO network or other wireless network. The wireless network 10 may include a radio access network ("RAN") portion 12 and a core IP (Internet Protocol) portion 14, which contains a carrier wide area network ("WAN") 15. Although for simplicity, the WAN 15 is shown connected to a single RAN portion 12, it should be understood that multiple RAN portions 12 would be implemented to provide large wireless network coverage area. The RAN portion 12 includes one or more fixed base stations 16, each with various transceivers and antennae for wireless radio communications with a number of distributed wireless mobile clients 18a-18c, e.g., mobile phones, "3-G" (third generation) wireless devices, wireless computers, and the like. The base stations 16 are in turn connected to a mobile switching center and/or radio network controller ("RNC") 22 and other components which together act as the interface between the base stations 16 and the core IP portion 14, including directing data transfer to and from the base stations 16 for transmission to the mobile clients 18a-18c.

The base stations 16, when communicating with the mobile clients 18a-18c, transfer a designated amount of data 24 over a network airlink 26, 28 to the mobile clients 18a-18c. (By "transfer," it is meant the reception and/or transmission of data. "Airlink" refers to any radio channel or link over which data is transferred, e.g., the forward and/or reverse radio links 26, 28 of the wireless network 10, respectively.)

As indicated above, the method of the present invention may be implemented on different types of wireless communications networks, for example the CDMA-based 1×-EVDO network 10 shown in FIG. 1. 1×-EVDO is an implementation of the CDMA2000® 3-G mobile telecommunications protocol/specification configured for the high-speed wireless transmission of both voice and non-voice data. For conducting wireless communications between the base stations 16 and the wireless mobile clients 18a-18c, the RAN portion 12 utilizes a CDMA (code division multiple access) spread-spectrum multiplexing scheme. In CDMA-based networks, transmissions from mobile clients 18a-18c to base stations 16 are across a single frequency bandwidth known as the reverse link 28, e.g., a 1.25 MHz bandwidth centered at a first designated frequency. Generally, each mobile client 18a-18c is allocated the entire bandwidth all the time, with the signals from individual wireless units being differentiated from one another using an encoding scheme. Transmissions from base stations 16 to mobile clients 18a-18c are across a similar frequency bandwidth (e.g., 1.25 MHz centered at a second designated frequency) known as the forward link 26. The forward and reverse links may each comprise a number of traffic channels and signaling or control channels, the former primarily for carrying data, and the latter primarily for carrying the control, synchronization, and other signals required for implementing CDMA communications. The RAN portion 12 may be geographically divided into contiguous cells, each serviced by a base station 16, and/or into sectors, which are portions of a cell typically serviced by different antennae/receivers supported on a single base station 16.

Specific elements of the RAN portion 12, i.e. a specified base station 16 and RNC 22, service a specified mobile client 18a, depending largely upon the location of the specified mobile client 18a. The elements of the RAN portion 12 servicing the specified mobile client 18a receive signaling from the specified mobile client 18a, for example, the specified mobile client 18a sends a connection request to the servicing base station 16 when a connected state is desired by the specified mobile client 18a.

The wireless network 10 may be connected to external networks such as a public switched telephone network, or to the Internet 30. For high-speed data transmission to and from the Internet 30 or elsewhere (e.g., for facilitating web browsing, real time file transfer, or downloading large data files), the network 10 may use the Internet Protocol, where data is broken into a plurality of addressed data packets. Additionally, voice over IP ("VoIP") may be used for voice-data transmission. (With VoIP, analog audio signals are captured, digitized, and broken into packets like non-voice data.) Both voice and non-voice data packets are transmitted and routed over the wireless network 10, where they are received and reassembled by the mobile clients 18a-18c to which the data packets are addressed. For use in transferring packet data between the RAN portion 12 and external networks such as the Internet 30 (or otherwise), the core IP portion 14 of the wireless network 10 will typically include one or more intermediate network elements, connected through the WAN 15. For example, the core IP portion 14 may include a home agent ("HA") 32 where the packet or other data is initially routed from the Internet 30, a packet data serving node ("PDSN") 34 for routing wireless unit originated or terminated packet data, and an authentication, authorization, and accounting module ("AAA") 36. Additionally, the WAN 15 may employ a firewall 38 for protection.

In the wireless network 10, packet data 40 (e.g., arriving from the Internet 34 for transfer to an wireless unit 18a) is typically routed from the PDSN 34 to the RNC portion 12. The PDSN 34 may include a foreign agent ("FA") 42 for providing a serving care-of address to the home agent 32 during IP mobility, i.e. a temporary IP address for the specified mobile client 18a, thereby allowing the home agent 32 to communicate with the specified mobile client 18a. Alternatively, in wireless networks using Proxy Mobile IP (PMIP), a proxy in the network rather than the foreign agent 42, such as the PDSN 34, handles mobility registration on behalf of the mobile clients 18a-18c. The RAN portion 12 may include a packet control function ("PCF") 44 for managing the relay of data packets between the PDSN 34 and base stations 16. From the PCF 44, the packet data is transferred to the RNC 22, and then to the base stations 16.

An application running on an external application server 46, which is connected to the Internet 34, may transfer data to any of the mobile clients 18a-18c in the manner described above. Advantageously, the network 10 includes a wireless information node ("WIN") network 48 having at least one wireless information node 50 ("WIN") and at least one wireless information database 52. The WIN 50 is able to extract information from the RNC 22 and make the extracted information available to the external application server 46 through the Internet 30. For example, a current geolocation of the mobile client 18a may be known by specific element of the RAN portion 12, e.g. the base station 16 servicing the mobile client 18a, and this information may be extracted by the WIN 50 and made available to the external application server 46 through the WIN network 48. Since the WIN network 48 is connected to both the RAN portion 12 and the application server 46, the WIN network 48 eliminates the need for the RAN to inspect the data packets 40 flowing through the RAN network, which is difficult or impossible for the RAN to do because the packets are likely tunneled or encrypted. The need for inspection by the RAN is eliminated because the WIN network 48 provides a linkage between the IP data flows and the RAN elements, i.e. the RNC 22, that are delivering the flows to the mobile client.

Additionally, by communicating with the elements of the wireless network 10, the WIN 50 is able to function without requiring a special unit with which to communicate on the mobile client 18a-18c. Therefore, the WIN 50 may provide the same benefit to all mobile clients 18a-18c without modification to the mobile clients 18a-18c. By extracting information from the RAN portion 12, further benefit is achieved through the use of the WIN network 48 because there is no direct or additional signaling between the mobile clients 18a-18c and the WIN 50. Additionally, no direct signaling between the mobile clients 18a-18c and the application server 46 is necessary for the WIN 50 to extract information from the wireless network 10.

As stated above, the WAN 15 may be connected to a plurality of RAN portions 12, each of which has its own plurality of base stations 16. Therefore, in a typical wireless network, the application server 46, which wants to transfer data to the mobile client 18a, is not able to determine to which leg of the wireless network 10, i.e. RNC 22 and base station 16, the mobile client 18a is connected. The wireless network 10, according to the present invention, includes the WIN network 48, which is able to provide information to the application server 46 about the location of the mobile clients 18a-18c.

Through the WIN 50, the WIN network 48 may determine bindings between RAN layer 2 mobile client device and subscriber identifiers, e.g. the mobile client's International Subscriber Identity, Electronic Serial Number, or Mobile Equipment Identifier and higher layer identifiers such as internet protocol (IP) addresses or Network Address Identifiers. This information is used by the WIN network 48 to determine which elements of the RAN portion 12 are servicing the specified mobile client 18a, i.e. which RNC 22 and/or base station 16 is communicating with mobile client 18a. This WIN network 48 may then make this communication information available to the external application server 46 through the Internet 30.

An embodiment of the method for opportunistically delivering application packet data from an application server to a mobile client according to the present invention will now be explained in further detail with reference to FIGS. 1 and 2. As noted above, a specified mobile client 18a can be in one of two states, the idle state where user data cannot flow or the connected state where data may flow both to and from the mobile client 18a. The WIN network 48 provides for the identification of the elements of the RAN portion 12 that are servicing the specified mobile client 18a both in the idle state and the connected state. Thus, in step S1, an application running on an external application server 46, e.g. a chatty application, registers with the WIN network 48 to be notified when the specified mobile client 18a transitions to or from the connected state. For example, Session Initiation Protocol (SIP) mechanisms of SUBSCRIBE and NOTIFY may be utilized. In step S2, the WIN network 48 identifies the elements in the RAN portion 12 servicing the specified mobile client 18a. As noted above, the identification of the elements in the RAN portion 12 servicing the desired mobile client 18a may be accomplished by detecting the bindings between the RAN layer 2 identifiers and the higher layer identifiers. Once the elements of the RAN portion 12 servicing the desired mobile client 18a have been identified by the WIN network 48, in step S3, the WIN network 48 registers with the elements of the RAN portion 12 servicing the specified mobile client 18a to be notified whenever the connection state of the specified mobile client 18a changes. In step S4, the elements in the RAN portion 12 servicing the specified mobile client 18a detect whether the specified mobile client 18a is in a connected state or in an idle state, which may be done in the manner discussed above. If the elements of the RAN portion 12 detect an idle state, they wait until a connected state is detected. In step S5, when the elements of the RAN portion 12 servicing the specified mobile client 18a detect that the mobile client 18a is in a connected state, the elements servicing the specified mobile client 18a notify the WIN network 48 of the connected state. Then, in step S6, the WIN network 48 notifies the application server 46 of the connected state. In step S7, upon notification of the connected state at the application server 46, the application server 46 delivers packet data 40, in the manner described above, to the specified mobile client 18a. Therefore, the chatty application, which has QoS requirements that allow data to be delivered in the background, is able to deliver data to the specified mobile client 18a when the mobile client 18a is connected to the wireless network 10 for some other purpose, thereby minimizing the total usage of the wireless network 10.

In another embodiment, the RAN portion 12 of the wireless network 10 may be configured to automatically delay paging to initiate delivery of any network initiated non-latency sensitive data, e.g. the data sent by a chatty application. Latency in a communication network is a packet-oriented measure of the duration of processing for packets at a network node. Latency sensitive data is data wherein the packets are sensitive to latency such that delay may induce jitter and/or packet loss degrading performance of the system. QoS levels allow latency sensitive data to pass through the network with higher priority that non-latency sensitive data. The WIN network 48 may be implemented to bypass the automatic delay for friendly non-latency sensitive data, i.e. data from a chatty application that has registered with the WIN network 48, while maintaining the delay for other non-latency sensitive data. Referring to the embodiment of FIG. 3, in the network with the automatic paging delay, upon notification at the application server 46 of the connected state for the specified mobile client 18a (step S6, FIG. 2), it is first determined in step S8 whether the application server 46 registered with the WIN network 48 (step S1, FIG. 2). If the application server 46 did register with the WIN network 48, the application server 46 may send a page request to the WIN network 48 in Step S9. For example an SIP mechanism of PAGE_REQUEST may be used. In step S10, the application server 46 begins paging to initiate packet delivery to the desired mobile client 18a. In step S11, the RAN portion 12 evaluates whether the data is latency sensitive data or non-latency sensitive data. For example, QoS levels could be used by the RAN portion 12 to identify non-latency sensitive data, e.g. the data sent by a chatty application, from latency sensitive data. In step S12, if the data is latency sensitive data, the data is delivered by the RAN portion 12, without delay. In step 13, if the data is identified as non-latency sensitive data, i.e. the answer to step S11 is yes, it is evaluated whether the application server 46 sent a page request (step S9) to the WIN network 48. If the application server 46 did send a page request to the WIN network 48, in step S14, the WIN network 48 immediately triggers paging to initiate data delivery, and the data is delivered without delay in step S15. However, if a page request was not sent by the application server 46 to the WIN network 48, in step S16, paging to initiate delivery of the data is delayed by the RAN portion 12 prior to delivery in step S17. Therefore, while the automatic delay creates a penalty for setting up a connection, those applications that are latency sensitive and non-latency sensitive friendly applications, i.e. applications running on application servers 46 that register with the WIN network 48, will see improved delay performance.

Referring back to FIG. 1, the detection that the specified mobile client 18a has a connected or idle connection state has thus far been described in terms of detection at the base station 16 or RNC 22 because these elements of the RAN portion 12 receive signals directly from the mobile clients 18a-18c whenever the connection state of the mobile clients 18a-18c change. Another embodiment for detecting the connected state of the mobile clients 18a-18c in the wireless network 10 by the WIN network 48 is accomplished through analysis of accounting records. In the wireless network 10, the PDSN 34 may act as a network access server by sending network access accounting information regarding the specified mobile client 18a to the AAA 36 over the WAN 15 when the specified mobile client 18a is assigned a traffic channel, i.e. enters a connected state. In this embodiment, detection that the specified mobile client 18a has activated its traffic channel is performed by analysis of accounting records.

For example, when the specified mobile client 18a enters a connected state, the PDSN 34 sends a RADUIS accounting request to the AAA 36 of Acct-Status-Type=Start and Airlink-Record=Active Start. Alternatively, when the specified mobile client 18a enters an idle state, the PDSN 34 sends a RADIUS accounting request to the AAA 36 with Airlink-Record=Active Stop.

Either the PDSN 34 sending the request or the AAA 36 receiving the request could use this accounting request to detect the change in the connection state of the specified mobile client 18a. Accordingly, referring to FIG. 2, the WIN network 48, which is connected to the WAN 15, may identify the elements of the WAN 15, i.e. the PDSN 34 or AAA 36, transferring access accounting information regarding the specified mobile client 18a in step S2. The WIN network 48 may then register, in step S3, with the PDSN 34 or the AAA 36 to be notified when the connection state of the specified mobile client 18a changes, whereby the WAN elements detect the connected state of the mobile client 18a in step S4. The WAN elements notify the WIN network in step S5, and the WIN network 48 may then notify the application server 46, which is able to opportunistically deliver packets when the specified mobile client 18a is connected to the wireless network 10 for some other purpose.

Figure 4:
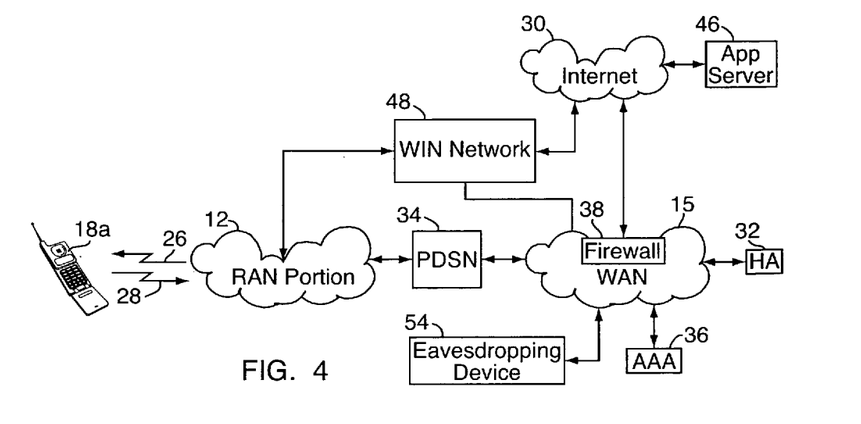
FIG. 4 is a schematic diagram of a cellular network according to an embodiment of the present invention.

Alternatively, as shown in FIG. 4, an eavesdropping device 54, such as a port mirror, may be connected to the WAN 15 to analyze network access accounting records to detect the connection state of the specified mobile client 18a. In this embodiment, the WIN network 48 would register with the eavesdropping device 54 to be notified when the connection state of the specified mobile client 18a changed.

Figure 5:
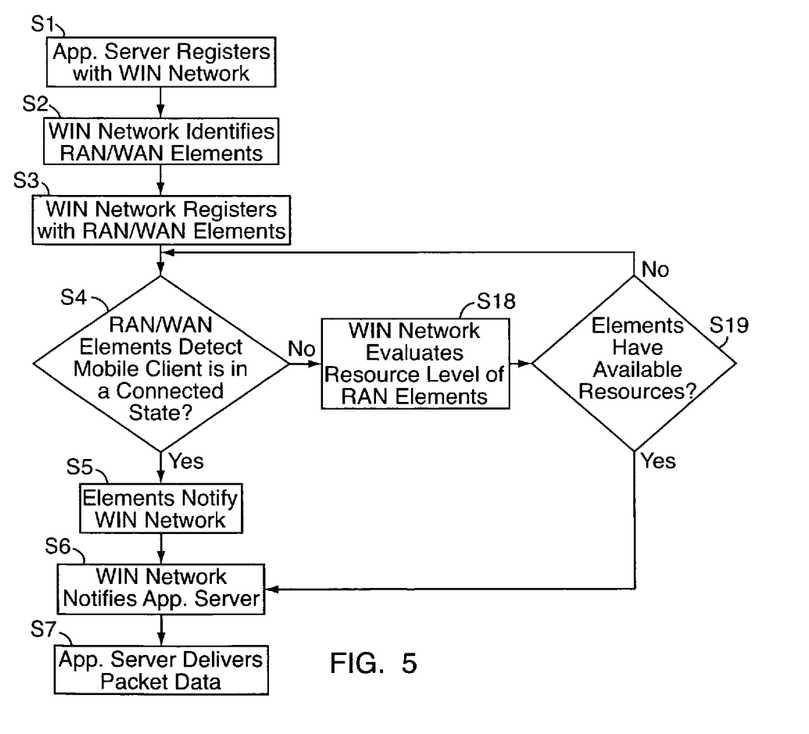
FIG. 5 is a flowchart showing a method of opportunistic delivery of application data according to another embodiment of the present invention.

Referring to FIG. 5, in another embodiment of the present invention, the WIN network 48 evaluates the resource level of the RAN portion 12 at the elements servicing the specified mobile client 18a and determines if RAN portion 12 has available resources at the elements to provide to the application server 46 even if the specified mobile client 18a is not in a connected connection state. If the elements of the RAN portion 12 servicing the specified mobile client 18a detect that the mobile client 18a is in an idle state, i.e. the answer to step S4 is no, then, rather than waiting for a connected state as was done in the embodiment shown in FIG. 2, the WIN network 48 evaluates the resource level of the elements of the RAN portion 12 servicing the specified mobile client 18a in step S18. For example, when the specified mobile client 18a performs layer 2 registration with the elements of the RAN portion 12 for mobility management purposes, the WIN network 48 measures the loading condition at the specified elements of the RAN portion 12. In step 19, the WIN network 48 determines if the elements of the RAN portion 12 servicing the specified mobile client 18a have available resources. If not, the application server 46 waits until either the specified mobile client 18a enters a connected state or until the WIN network 48 determines that the elements servicing the specified mobile client 18a have available resources, at which time, the WIN network 48 notifies the application server 46 in step S6 and the application server 46 delivers the packets in step S7.

This embodiment allows the application server 48 to immediately deliver any queued presence information when resources are available, without the penalty incurred for the high demand in establishing a connection negatively impacting the wireless network loading. Additionally, by performing the data transfer after the mobile client 18a performs layer 2 registration for mobility management purposes, the paging to deliver such data is more efficient because the mobile client's current location is known.

As disclosed in the above-mentioned embodiments, the WIN network 48 is not only able to determine when a specified mobile client 18a enters a connected state where its traffic channel becomes active, but also when a specified mobile client 18a enters an idle state where its traffic channel becomes idle. For example, when registering with the base station 16 or RNC 22, the detection may be caused by a layer 2 signal to release the connection, communicated directly from the mobile client 18a. Alternatively, in the embodiment wherein detection is performed by analysis of accounting records, the determination may be triggered by the RADIUS accounting-request with Airlink-Record=Active Stop.

Figure 2:
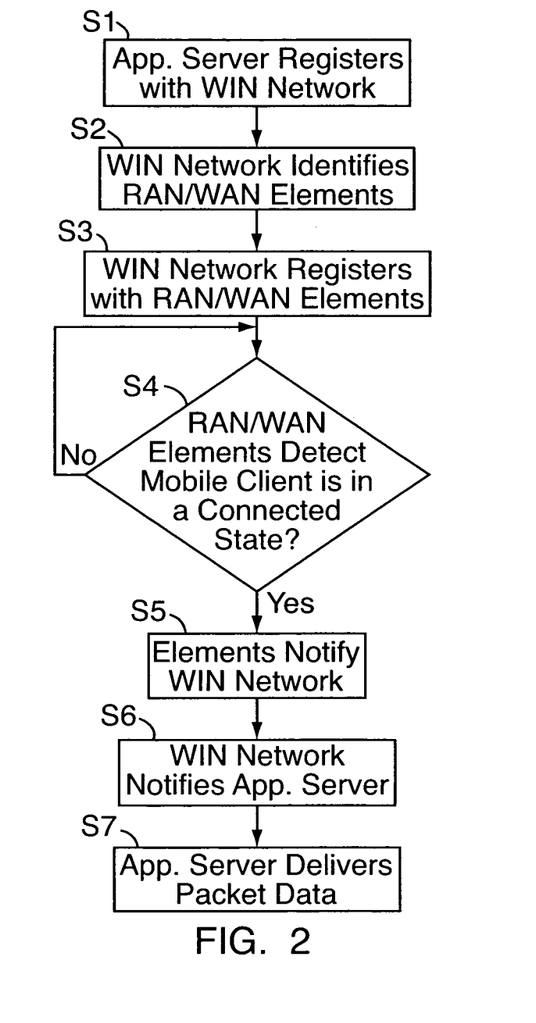
FIG. 2 is a flowchart, showing a method of opportunistic delivery of application data according to an embodiment of the present invention.
Figure 3:
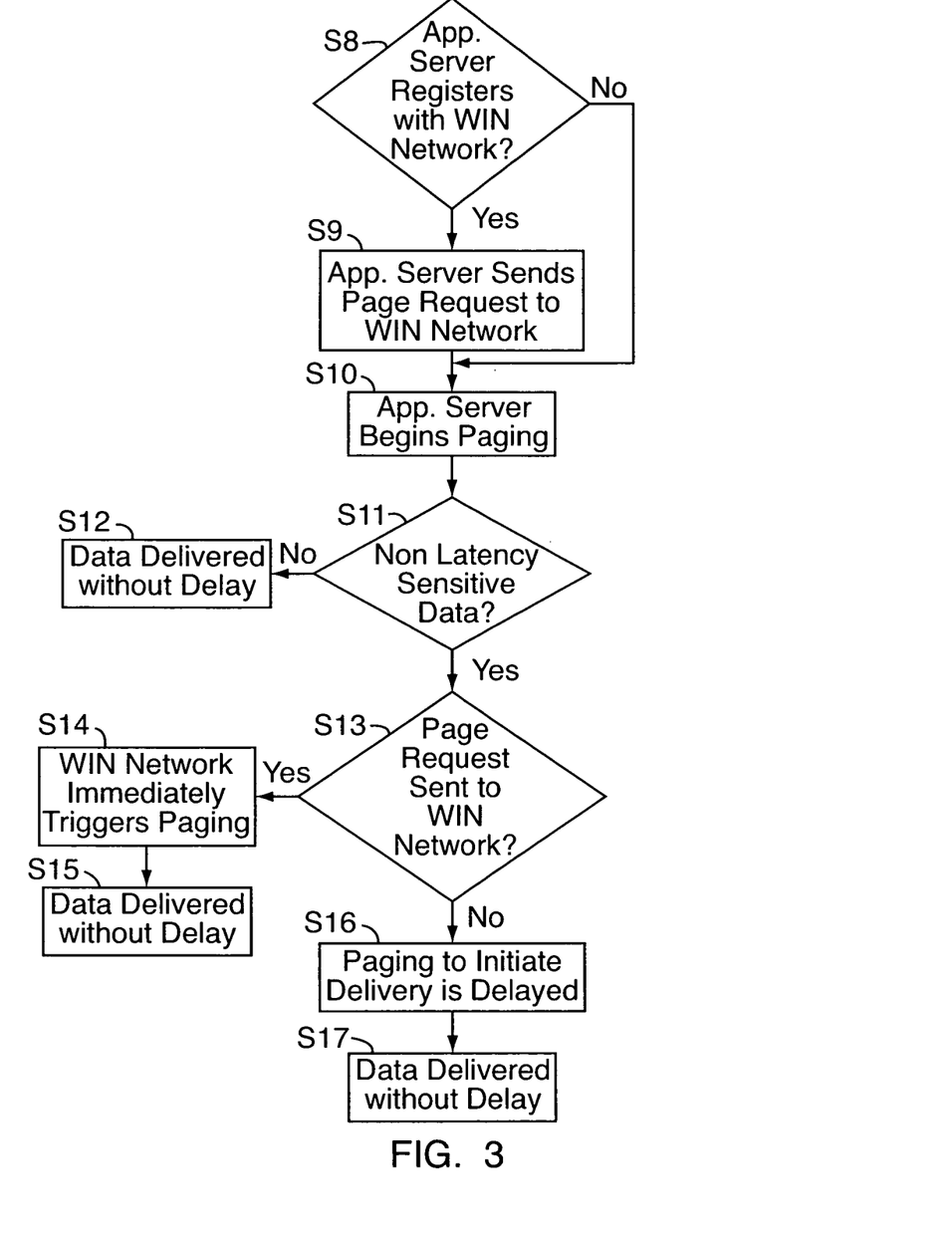
FIG. 3 is a flowchart showing a method of opportunistic delivery of application data according to another embodiment of the present invention.
Figure 6:
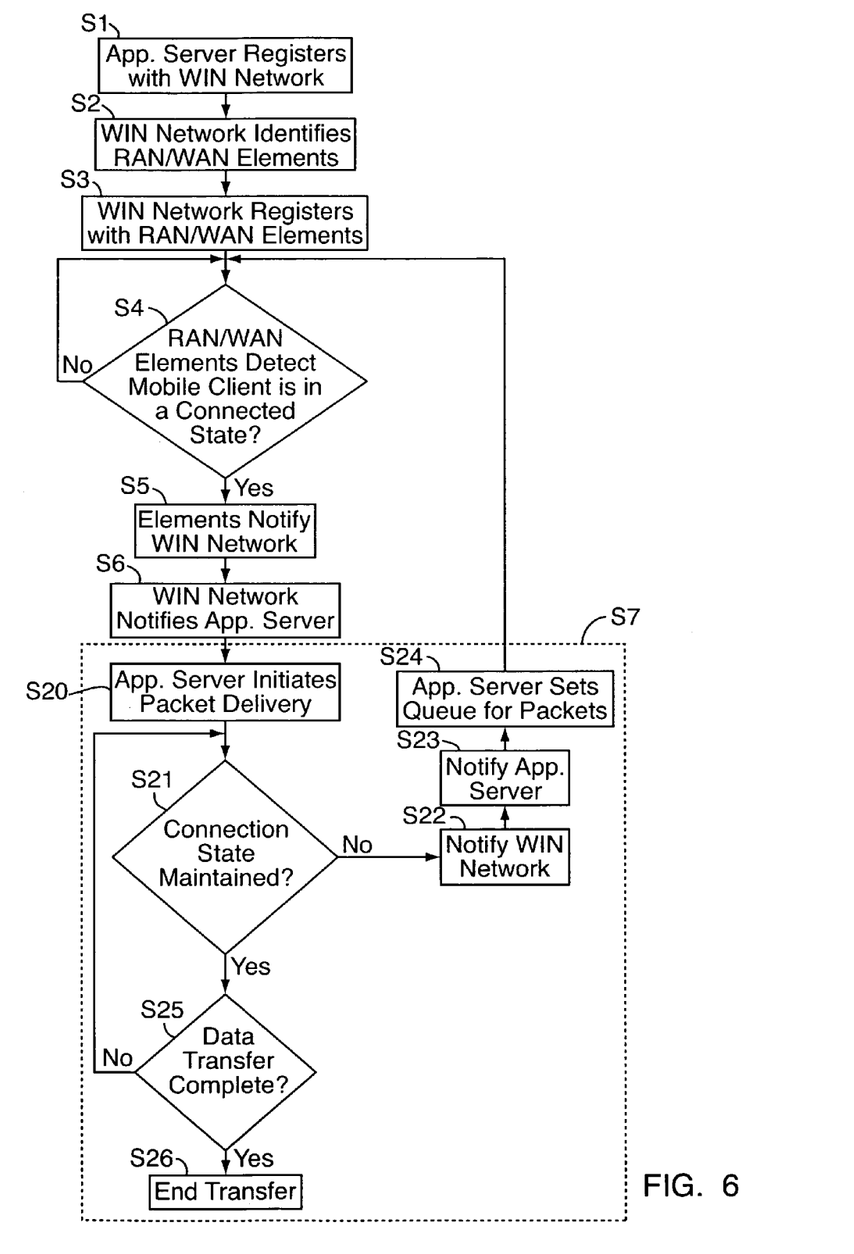
FIG. 6 is a flowchart showing a method of opportunistic delivery of application data according to another embodiment of the present invention.

Referring to FIG. 6, the signal that the specified mobile client 18a has transitioned from a connected state to an idle state may be used by the application server 46 while delivering packet data 40, i.e. executing step S7 of FIG. 2, to determine when to renew queuing incoming packets if the specified mobile client 18a enters an idle state. In step S20, the application server 46 begins delivering data packets to the specified mobile client 18a. In step S21, the elements of the RAN portion 12 servicing the specified mobile client 18a, or where detection is performed by analysis of accounting records, the PDSN 34, AAA 36 or eavesdropping device 54, continue to evaluate whether the connection state of the specified mobile client 18a changes to an idle state. If the specified mobile client 18a enters an idle state, i.e. the answer to step S21 is no, then the element detecting the connection state notifies the WIN network 48 in step S22. In step S23, the WIN network 48 then notifies the application server 46. In step S24, the application server 46 uses this information to determine when to renew queuing of incoming packets. Then, the application server 46 waits for the specified mobile client 18a to resume a connected state. This allows the application server 46 to resume the data packet transfer from the queue when the specified mobile client 18a resumes a connected state. If during the packet transfer the connected state of the specified mobile client 18a is maintained, i.e. the answer to step S21 is yes, the data packet delivery continues until completed in step S35. When the data transfer is complete, the data transfer ends in step S26.

Since certain changes may be made in the above-described method and system for opportunistic delivery of application data in a wireless network, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system for data delivery from an application server to a mobile client in a wireless network, the system comprising:

a packet data servicing node connected to the application server and to the wireless network for transmitting packet data from the application server to the mobile client, and a wireless information node ("WIN") network including at least one wireless information node and at least one wireless information database, the WIN network being connected to the application server and to the wireless network, wherein, without the mobile client signaling the application server, an element of the wireless network is configured to notify the WIN network that the mobile client is in a connected state, the WIN network is configured to notify the application server that the mobile client is in the connected state and the application server is configured to send packet data to the mobile client through the packet data servicing node.

2. The system according to claim 1, wherein the element of the wireless network is an element of a radio access network ("RAN") portion of the wireless network.

3. The system according to claim 1, wherein the element of the wireless network is an element of a wide area network ("WAN") of the wireless network.

4. The system according to claim 2, wherein the element of the RAN portion of the wireless network is a radio network controller.

5. The system according to claim 2, wherein the element of the RAN portion of the wireless network is a base station.

6. The system according to claim 2, wherein the element of the RAN portion of the wireless network is a packet control function.

7. The system according to claim 3, wherein the element of the WAN of the wireless network is a packet data serving node.

8. The system according to claim 3, wherein the element of the WAN of the wireless network is an authentication, authorization, and accounting module.

9. The system according to claim 3, wherein the element of the WAN of the wireless network is an eavesdropping device.

10. A wireless network comprising:
a radio access network ("RAN") portion including a base station adapted for wireless connection with a mobile client;
a core IP portion including a packet data servicing node, the core IP portion enabling data transfer between the RAN portion and an application server through the packet data servicing node; and
a wireless information node ("WIN") network having at least one wireless information node and at least one wireless information database,
wherein the WIN network is connected to the RAN portion and to the application server, the WIN network, without the mobile client signaling the application server, is configured to detect one or more elements of the RAN portion servicing the mobile client and to notify the application server that the mobile client is in a connected state, and
wherein the application server is configured to send packet data to the mobile client through the packet data servicing node when notified that the mobile client is in the connected state.

11. The wireless network according to claim 10, wherein the application server is configured to send packet data upon detection of available resources in an element of the wireless network servicing the mobile client.

12. A method of packet delivery from an application server to a mobile client in a wireless network having a wireless information node network for notifying the application server that the mobile client is in a connected state and a packet data servicing node for transmitting packet data from the application server to the mobile client, said method comprising the steps of:
monitoring the connection state of the mobile client at the wireless information node network without the mobile client signaling the application server;
notifying the application server of a change in the connection state of the mobile client through the wireless information node network; and
sending packet data to the mobile client through the packet data servicing node upon notification of a change in the connection state of the mobile client from the wireless information node network.

13. The method according to claim 12, wherein the step of sending packet data to the mobile client begins upon notification of a connected state.

14. The method according to claim 12, wherein the step of sending packet data to the mobile client includes triggering paging to initiate delivery without delay.

15. The method according to claim 12, wherein the step of sending packet data to the mobile client begins upon evaluation of available resources in an element of the wireless network servicing the mobile client.

16. The method according to claim 12, wherein sending packet data to the mobile client includes the steps of:
initiating transfer of packet data; and
monitoring the connection state of the mobile client until the delivery of packet data is complete.

17. The method according to claim 15, wherein the step of sending packet data to the mobile client includes triggering paging to initiate delivery without delay.

18. The method according to claim 16, additionally including the steps of:
notifying the application server that the mobile client has transitioned to an idle state; and
terminating the delivery of packet data upon notification that the mobile client has transitioned to the idle state.

19. The method according to claim 16, wherein initiating transfer of packet data includes triggering paging to initiate delivery without delay.

* * * * *